United States Patent [19]

Chase

[11] 4,291,294
[45] Sep. 22, 1981

[54] SPECTRALLY BALANCED CHROMATIC LANDING APPROACH LIGHTING SYSTEM

[75] Inventor: Wendell D. Chase, Saratoga, Calif.

[73] Assignee: The United States of America as represented by the Administrator of the National Aeronautics and Space Administration, Washington, D.C.

[21] Appl. No.: 749,420

[22] Filed: Dec. 10, 1976

[51] Int. Cl.³ .............................................. B64F 1/20
[52] U.S. Cl. .................................. 340/26; 244/114 R
[58] Field of Search ...................... 340/26; 244/114 R; 362/62, 262, 382; 35/12 N

[56] References Cited

U.S. PATENT DOCUMENTS

| | | | |
|---|---|---|---|
| 2,501,504 | 3/1950 | Garbell | 340/26 |
| 2,582,742 | 1/1952 | Bartow | 340/26 |
| 2,734,180 | 2/1956 | Pennow | 340/26 |
| 2,968,023 | 1/1961 | Ferguson et al. | 340/26 |
| 3,152,316 | 10/1964 | Baxter et al. | 340/26 |
| 3,279,406 | 10/1966 | Ricketts et al. | 340/26 |
| 3,964,015 | 6/1976 | Collins | 340/26 |

OTHER PUBLICATIONS

Proceedings of SPIE, vol. 59, "Simulators and Simulation", pp. 48–54, Mar. 1975.

Primary Examiner—James J. Groody
Attorney, Agent, or Firm—Darrell G. Brekke; John R. Manning

[57] ABSTRACT

A landing approach lighting system which corrects for the effects of chromatic aberration of the human eye to help prevent a pilot from making misjudgments leading to landings short of a runway threshold.

The system utilizes red warning lights to delineate the runway approach with additional blue lights juxtaposed with the red lights such that the red lights are chromatically balanced. The red/blue point light sources result in the phenomenon that the red lights appear in front of the blue lights with about one and one-half times the diameter of the blue. To a pilot observing these lights along a glide path, those red lights directly below appear to be nearer than the blue lights. For those lights farther away seen in perspective at oblique angles, the red lights appear to be in a position closer to the pilot and hence appear to be above the corresponding blue lights. This produces a very pronounced three-dimensional effect referred to as chromostereopsis which provides valuable visual cues to enable the pilot to perceive his actual position above the ground and the actual distance to the runway.

7 Claims, 8 Drawing Figures

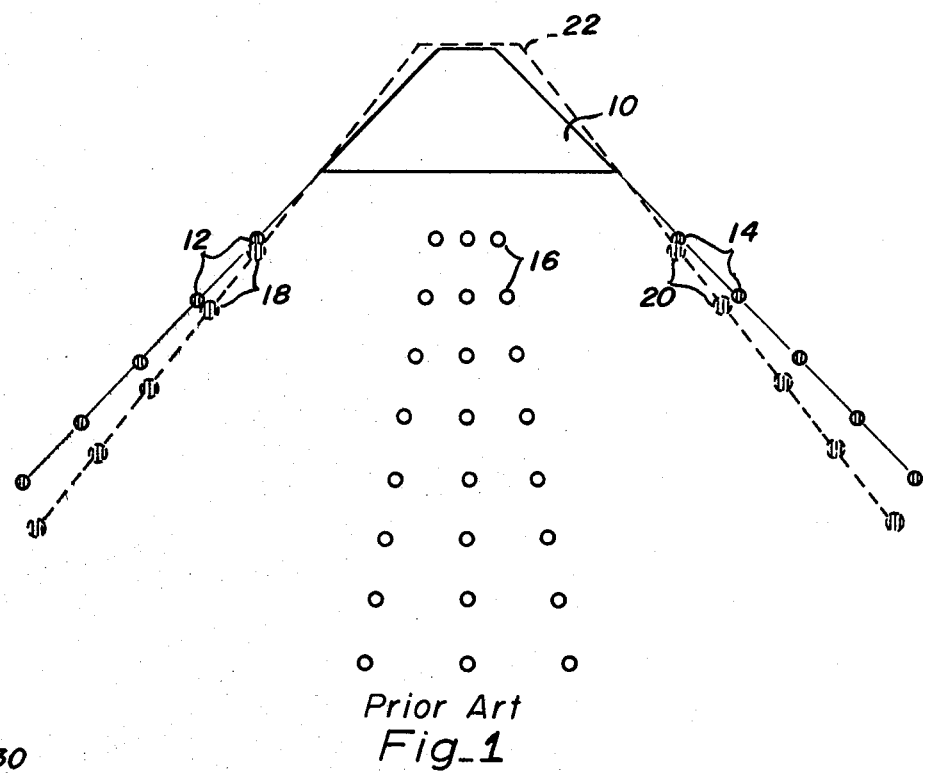
Prior Art
Fig_1
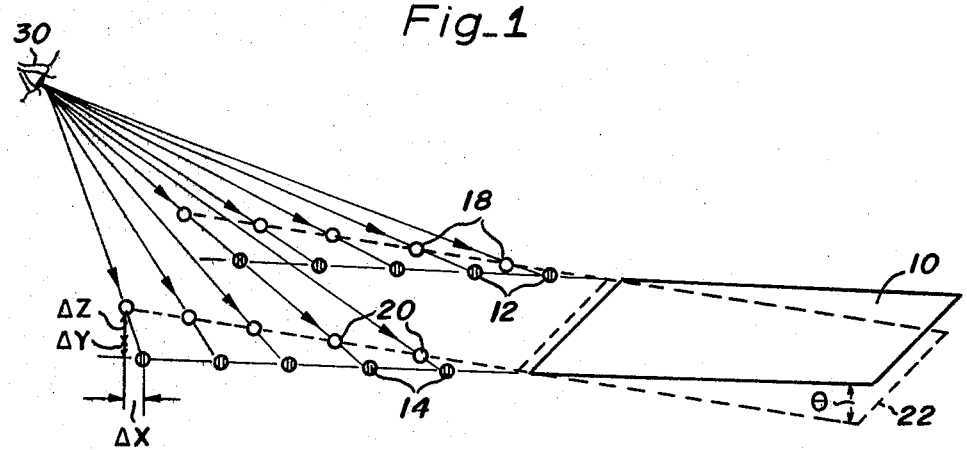
Prior Art
Fig_2
◉ BLUE
◍ RED
○ WHITE

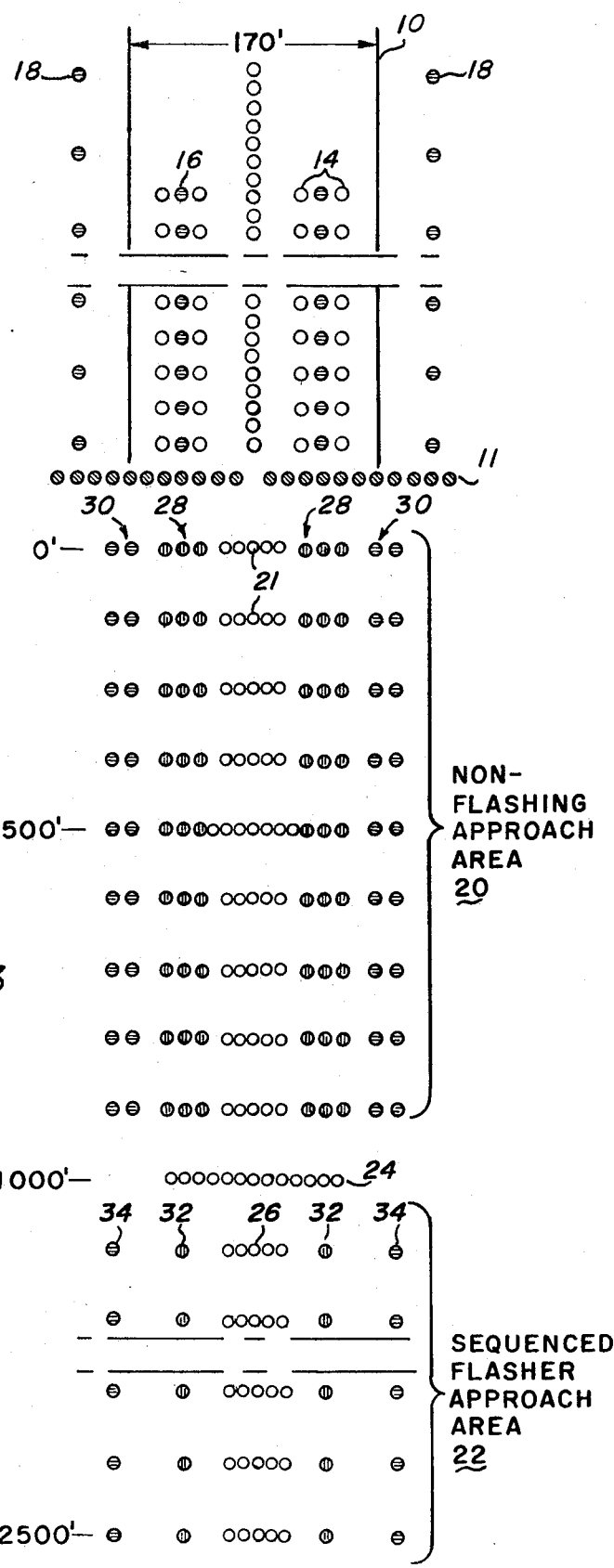
Fig_3

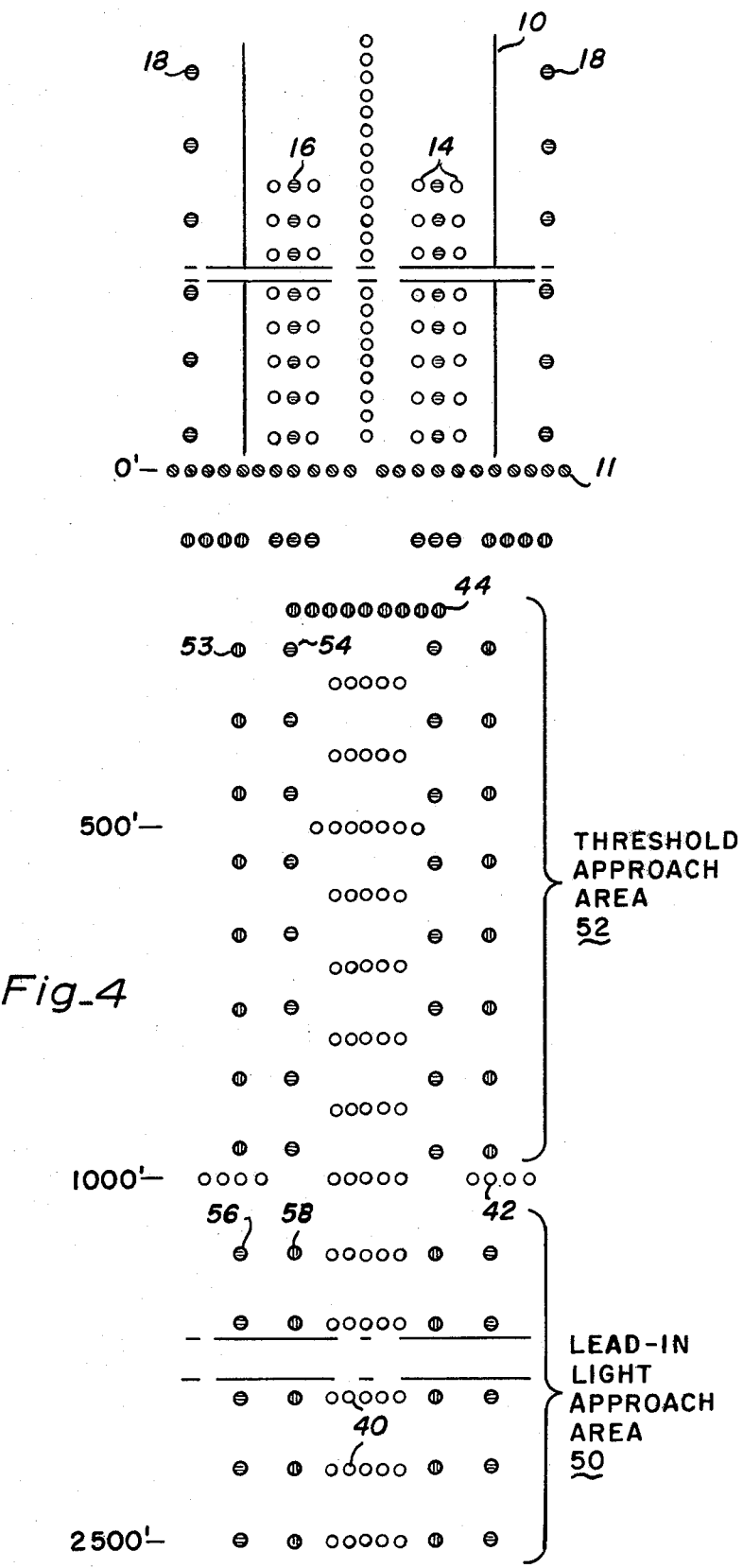

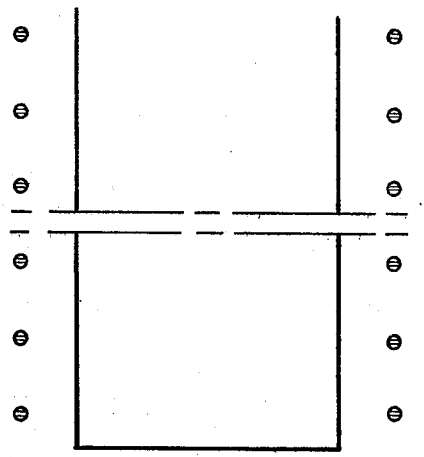
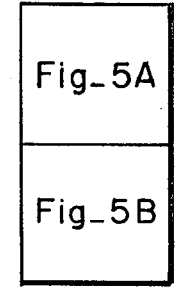
Fig_5C
Fig_5A
Fig_5B

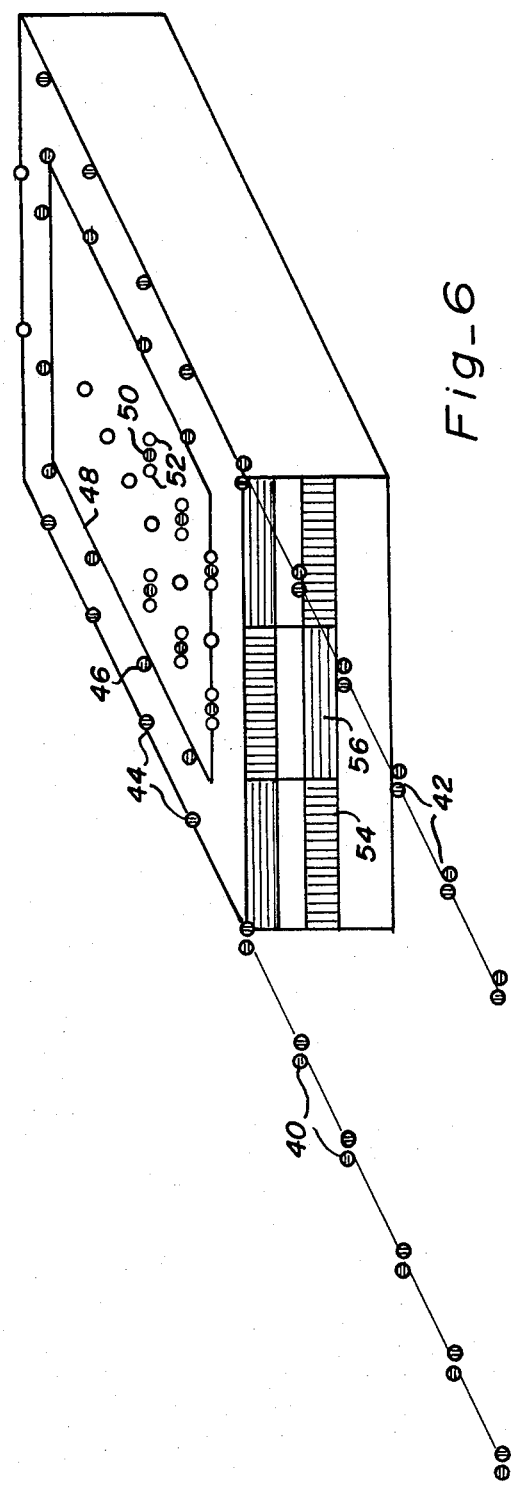
Fig_6

SPECTRALLY BALANCED CHROMATIC LANDING APPROACH LIGHTING SYSTEM

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to warning light systems and more particularly to an improved landing approach lighting system for use in airport installations.

2. Description of the Prior Art

Red lights have been placed in the approach lighting system at airport installations as warning indicators to the pilot that the aircraft is close to the runway threshold. These lights have produced an illusion to the pilot that he is actually closer to the threshold than he actually is. This phenomenon can be responsible for landings short of the runway. Furthermore, during conditions of reduced visibility, red lights in the approach lighting system are the first part of the visible spectrum to disappear due to high absorption of the red end of the spectrum.

The most crucial area of an aircraft approach to a runway is from the last one thousand feet of altitude and three to four miles range. During this approach, the lead-in lights in the surrounding area of the runway are used by the pilot as he transitions back and forth from the instrument panel to the scene viewed through the wind screen. In most major airport installations, the lead-in lights begin at three thousand feet from the runway threshold and the aircraft at this point is normally at about two hundred and ten feet above the ground. During conditions of good visibility, the pilot usually lands from this point on by viewing the runway through the wind screen. If the aircraft is too high, the pilot may have initiated a duck under maneuver which might place the aircraft low relative to the glide slope. Because of some inherent defects in the current design of approach lighting systems, the pilot may inadvertently place the aircraft too low relative to the glide slope and consequently be forced to make a dangerous landing short of the runway threshold.

The approach lighting system of present day runways consists of signal lights arranged symmetrically about the runway center line extended starting at the landing threshold outward into the approach zone. These systems provide visual information on runway alignment, roll guidance, and horizon references. For example, in the most widely used approach lighting system, rows of red lights are placed in line with edges of the runway with added rows of white touch-down zone lights. Adjacent to the main runway and runway edge lights are taxiways which are lighted with blue lights. These blue lights are so arranged as to provide a clear and continuous indication of taxiing routes to be followed.

In the past, lighting systems have not provided adequate height perception visual cues. Some attempt has been made to place red lights on high towers. Due to chromatic aberration red lights alone produce an illusion that the obstacle is closer than it actually is.

Thus, approach lights and surrounding warning lights do not provide vertical guidance nor do they provide information regarding altitude and rate of descent. On the contrary, they can produce potentially disasterous illusions that the aircraft is too high or that its nose has pitched up. White lights contribute few visual cues and make it difficult for a pilot to determine the aircraft's real position in both altitude and range as it is approaching the runway at night. The extension of white lights out to the three thousand foot position along the runway center line contributes essentially no information other than center line guidance.

Red colored lights are placed in the approach sector of some lighting systems as warning lights to indicate to the pilot that he is over this area and short of the runway threshold. Because of the chromatic aberrations of the eye, a pilot actually perceives these lights incorrectly during a final approach.

Furthermore, during a poor visibility approach, the red lights located in the approach lighting system cannot be seen adequately. In fog, the penetration ability of red lights is very poor because of its high absorption characteristic. The first color to disappear in fog is the red end of the color spectrum.

Currently, there are no approach lighting systems which utilize the characteristics of the blue spectrum for its penetrating ability through fog.

SUMMARY OF THE INVENTION

It is a primary object of this invention to provide an improved landing approach lighting system which provides a pilot with critical altitude and range reference visual cues.

It is a further object of this invention to provide a landing approach lighting system which has a high penetration ability during poor visibility conditions.

A still further object of the invention is to provide an improved approach lighting system for elevated short take off or landing (STOL) airports.

The above objects are accomplished in accordance with the invention by providing a spectrally balanced chromatic landing approach lighting system which utilizes balanced red/blue adjacent lights at predetermined positions along the approach area of the runway.

In accordance with an aspect of the invention, a series of balanced red/blue lights are placed extending the entire three thousand feet of the lead-in lights. Blue lights are also placed among the touch down zone lights as well as positioned along the outer boundary of the entire runway.

In accordance with a further aspect of the invention, blue lights are placed along the outer boundary of the entire runway.

In accordance with still a further aspect of the invention, for a STOL system series of red/blue adjacent lights are positioned along the approach segment at essentially the same height as the STOL port. An outer perimeter of red lights identify the STOL port boundary, and a series of inner blue lights are used to identify the touch down zone boundary. Blue lights are also placed in the middle of the touch down zone lights.

Although the red/blue combination represents the largest chromatic spectral range, other combinations of colors obey the same principles. For example, blue/green chromatic combinations can be used.

The invention has the advantage that existing airports with night landing systems can be easily modified to incorporate the invention by balancing the approach lights for night landings.

The invention has the advantage that pilots making night landings are more readily able to perceive their actual position above the ground and distance to the runway. More particularly, the blue lights are perceived to remain on the ground while the red lights appear as if they were elevated above the ground.

The invention has the further advantage that during the final approach a balanced approach lighting system enables the pilot to maintain correct aircraft orientation because of better ground and altitude references. A pilot will also be able to maintain better aircraft glide slope position during encounters with wind disturbances when over a balanced approach lighting system constructed in accordance with the present invention.

The invention has the further advantage that the red lights placed in the approach as warning indicators as to the position of the runway threshold no longer produce an illusion to the pilot that the aircraft is closer to the threshold than it actually is and therefore will tend to eliminate landings short of the runway. The balanced lighting system of the present invention helps prevent illusions as to height and range and enables the pilot to make better visual judgment prior to touch down.

The invention also has the advantage that during conditions of reduced visibility, the blue lights in the approach path produce enough scattering to enable the pilot to see the runway before he could normally see it with current lighting systems. The invention has the further advantage that blue lights added in the white touch down zone lights improve the actual position of this area as perceived versus the current touch down lights which are all white.

The invention has an advantage when utilized with respect to STOL airports. Red/blue panels marking vertical positions of the approach path reduce the effects of chromatic aberration. Inner perimeter blue lights are used to aid the pilot as to the actual boundary of the airport area in combination with outer edge red lights which balances the entire area as perceived by the pilot and reduces the effect of chromatic aberration.

The invention has advantages when applied to spacecraft docking maneuvers. Red lights positioned opposite blue lights aid a command pilot to close on another spacecraft without the detrimental effects on depth perception due to chromatic aberration.

The principles of the invention can also be applied to wing tip red and green lights which currently provide no depth or altitude cues from which the pilot can rely. The use of chromatically balanced red and blue lights allows the pilot to obtain range and altitude information.

The principles of the invention can also be applied to motor vehicle tail lights to improve stopping distance due to improved depth perception.

The foregoing and other objects, features and advantages of the invention will be apparent from the following more particular description of the preferred embodiments of the invention as illustrated in the accompanying drawings.

BRIEF DESCRIPTION OF THE DRAWINGS

FIG. 1 is an illustration of a typical landing approach to an airport as seen from the cockpit of an approaching aircraft;

FIG. 2 is a side elevation of the view illustrated in FIG. 1;

FIG. 3 is an improved Category 1 and 2 (ALSF-1 and 2) landing approach lighting system incorporating the principles of the present invention;

FIG. 4 is an improved displaced threshold landing approach lighting system incorporating features of the present invention;

FIGS. 5A and 5B form a composite diagram of an improved Calvert landing approach lighting system incorporating the principles of the present invention;

FIG. 5C is a schematic presentation showing how FIGS. 5A and 5B should be interconnected.

FIG. 6 is an illustration of a short take-off or landing runway lighting system incorporating features of the present invention.

DESCRIPTION OF THE PREFERRED EMBODIMENTS

A study has been made to determine the effects of current landing approach lighting systems upon pilot performance during the landing approach maneuver. Results of that study are reported in a paper entitled "Effect of Color on Pilot Performance and Transfer Functions Using a Full-Spectrum, Calligraphic, Color Display System" by Wendell D. Chase presented at the AIAA Vision Simulation Conference, Dayton, Ohio on Apr. 26–28, 1976. The results of that study show that red lights utilized in landing approach systems create an optical illusion that the landing area is closer to the aircraft than it actually is. The reason for this is that due to chromatic aberrations of the eye, red always appears nearer to an observer than it actually is. The effect of the phenomenon on a pilot's perception is illustrated in FIG. 1.

Referring now to FIG. 1, a landing approach lighting system is shown. The approach to the airstrip 10 is delineated by rows of red lights 12, 14 on either side of the runway. These lights are positioned as warning lights to indicate to the pilot that the aircraft is short of the runway threshold. Rows of white centerline approach lights 16 are found in many approach lighting systems, such as the Calvert system used in Great Britain, as well as the ALSF-1 and 2 systems and their function is to provide centerline guidance towards the runway 10.

The dotted lines indicate how a pilot would actually perceive these approach lights during a final approach, as determined by the physiological chromatic aberrations of the eye. Since the color red appears to be closer to the eye than it actually is, the rows of runway lights appear to be closer, raised slightly off the ground, and moved inward toward the observer. This is illustrated by the rows 18, 20 of dotted lights. The result of this aberration is to give the illusion that the runway 10 is closer to the observer than it actually is. This can be seen by projecting back the imaginary lines formed by the rows 18, 20 of lights as perceived by the observer. This gives the appearance, as illustrated by the dotted lines 22, that the runway is closer than it actually is. This produces the illusion that the aircraft is too high or that its nose has pitched up. The white lights 16 contribute very few visual cues as to altitude and range as the aircraft is approaching the runway. Therefore, the extension of white lights 16 along the runway center line contributes essentially no information other than center line guidance. The result of this illusion is in many instances to cause the pilot to take corrective action which may cause the aircraft to land short of the runway.

The phenomenon can be seen even more clearly with reference to FIG. 2. From the point of view of the observer 30, the lights 12, 14 appear to be raised above the ground by a distance of $\Delta Z$, displaced distance $\Delta Y$, along the lines of sight from the observer 30 to the actual position of the lights on the ground. Projecting the rows of lights 18, 20 along the actual runway position 10, gives the illusion that the runway is displaced by an angle $\theta$. The result is that the observer 30 perceives the runway 10 to be in position 22 and to be closer to the observer than it actually is. Acting upon the erroneous perception, a pilot may attempt to land the aircraft short of the runway and low. As reported on the above-identified paper, experimentation under simulated night flying conditions has shown that the effects of an all red approach system gave the worst approach maneuver performance. A much better performance was obtained when the landing lights were replaced by blue lights. The best performance was, however, obtained for a balanced red/blue approach lighting system.

Considering now placing blue lights next to each red light in an array to form an array of red/blue point light sources located upon the ground and observed directly from overhead. The red lights would appear to be in front of the blue lights with about one and one-half times the diameter of the blue lights. If these rows of lights viewed by a pilot observing the lights along a landing glide path, for those that are directly below him, he would perceive that the red lights are nearer than the blue lights. For those lights seen in perspective at oblique angles, the red lights would be drawn along the lines of sight to a position closer to the pilot and hence would appear to be above the corresponding blue lights. Thus, a pronounced three-dimensional effect is perceived when viewing the red/blue light combinations.

This can be illustrated by reference again to FIGS. 1 and 2. Assuming now that each of the light sources 12, 14 includes a blue light source. The blue lights would appear to remain on the ground and more or less in the same position as shown by the rows of lights 12 and 14. The red lights, however, would be perceived to be closer and raised off the ground as illustrated by 18 and 20. This phenomenon, known as "color stereoscopy" or "chromostereopsis" is used to advantage to give the pilot visual cues as to his range and altitude with respect to the actual position of the runway 10.

Referring now to FIGS. 3, 4 and 5A-B, three typical present day landing approach lighting systems are shown with modifications in accordance with the principles of the present invention. These airport lighting systems are described in the literature and will not be described in detail herein. The guidelines for installing airport lighting systems can be found in the Handbook on Visual Lighting Guidance Systems, 6850.2, May 29, 1969, Department of Transportation—Federal Aviation Administration. The international standards are covered in a publication entitled "Aerodromes", Annex 14, Fifth Edition, May 1969, International Civil Aviation Organization.

The most widely used approach lighting systems within the United States are the ALSF-1 and the ALSF-2. Referring to FIG. 3, these systems are characterized by a sequenced flasher approach area 22 which is comprised of a series of sequenced lead-in flasher white lights 26. A bar of white lights 24 separates the flashing approach area 22 from a non-flashing approach area 20 which is comprised of a series of non-flashing center line lights 21. In the ALSF-2 configuration, rows of red lights 28 are placed in line with rows of white touch down zone lights 14. The threshold of the runway 10 is marked by a bar of green threshold lights 11.

To modify this system in accordance with the present invention, side rows of blue lights 30 are added to chromatically balance the side rows of red lights 28 in the non-flashing approach area 20. Side row red lights 32, and side row blue lights 34, are added to the sequenced flasher approach area 22 to delineate the outer boundaries of this area. The lights 32, 34 provide a chromatically balanced red/blue combination.

In order to provide ground reference information, blue lights 16 are added to the rows of touch down zone white lights 14. In addition, blue lights 18 are positioned along the outer boundary of the entire runway 10 in order to define the edges of the runway.

A modified version of the ALSF-1 and ALSF-2 approach lighting systems is shown in FIG. 4, and is known as a displaced runway threshold. This lighting system is characterized by centerline rows of non-flashing lead-in white lights 40, a separator bar of white lights at the 1000' mark (42) and a terminating bar of red lights 44 just prior to the runway threshold green lights 11.

In accordance with the principles of the present invention, the displaced threshold lighting system is modified by extending adjacent red/blue lights 53, 54 along the threshold approach area 52 such that the red lights 53 line up with the edge of the runway 10. Additionally, the lead-in lights 40 are delineated by rows of red/blue lights 58, 56 which are placed closer together than the rows of red/blue lights 53, 54 so that a pilot can distinguish between the lead-in light approach area 50 and the threshold approach area 52.

Additionally, blue lights are placed in the touch down zone area as well as positioned along the outer boundary of the entire runway in a pattern which is similar to that shown in FIG. 3.

FIG. 5 is a modification of the Calvert system used in Europe and Great Britain. This system is characterized by the primary use of white lights positioned in a converging pattern towards a touch down point on the runway. In the modified version, a series of converging red/blue adjacent lights are located along the outer edges of the entire three thousand feed of white lead-in lights. Also, blue lights are placed along the outer boundary of the entire runway. If touch down lights are used, blue lights are positioned within the touch down zone.

As illustrated by FIG. 6, the principles of the invention can be applied to an approach lighting system for elevated short take-off or landing airports (STOL ports). It should also be understood that the principles of the invention can be applied to aircraft carriers or any other elevated runway. As series red/blue adjacent lights are positioned along the approach at essentially the same height as the STOL port. This is illustrated in FIG. 6 by the row of lights 40, 42. A series of red lights 44 define the outer perimeter of the STOL port boundary. A series of inner blue lights 46 are used to identify a touch down zone boundary 48. Blue lights 50 are also placed in the middle of the touch down zone lights 52.

The structure also has panels of alternate red and blue lights 54, 56, respectively, to delineate the side wall of the structure.

Although the red/blue combination represents the largest chromatic spectral range, there are other combinations of colors which can be utilized to practice the principles of the invention. For example, blue and green produce the same type of effect as the red/blue spectral combination. The green lights would be more useful where there is fog present becaue red lights are absorbed more readily by fog than green lights.

The principles of the invention can be applied to single light sources which are used to mark a stationary object such as a tower at an airport or on a building or a stationary space vehicle in a docking maneuver and the principles can be applied to moving objects such as automobile tail lights, running lights on boats and airplanes. When used in these cases, the usual single red light is replaced by a chromatically balanced pair of red/blue lights or green/blue lights in order to take advantage of the more accurate perception of these combinations as described previously.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In an aircraft runway approach lighting system wherein said runway has a longitudinal centerline and said system includes a matrix of white lights delineating an approach area and straddling an axis coincident with said centerline, said matrix comprising rows of white lights transverse to said axis, each row having a left and a right end, the improvement comprising:
    a first linear array of red/blue light combinations adjacent said left row ends; and
    a second linear array of red/blue light combinations adjacent said right row ends, said arrays each being substantially parallel to said axis.

2. In an aircraft runway approach lighting system wherein said runway has a longitudinal centerline and said system includes a matrix of white lights delineating an approach area and straddling an axis coincident with said centerline, said matrix comprising rows of white lights transverse to said axis, each row having a left and a right end, the improvement comprising:
    a two-color light combination positioned on the right and left flank of each row, each combination comprising at least one blue light and one red light, said lights in each combination being at the same height.

3. In an aircraft runway approach lighting system wherein said runway has a longitudinal centerline and said system includes a matrix of white lights delineating an approach area and straddling an axis coincident with said centerline, said matrix having a plurality of rows of white lights transverse to said axis, the improvement comprising:
    a two-color light combination stationed at each end of each row of said white lights, each combination comprising at least one red light and at least one blue light, all of the lights within each combination being oriented in a straight line coincident with its particular row of white lights.

4. In an aircraft runway approach lighting system wherein said runway has a longitudinal centerline and said system includes a sequenced flasher light matrix straddling an axis projected from said centerline, said matrix having a first border on one side of said axis and a second border on the opposite side of said axis, the improvement comprising:
    a first linear array of red/blue light combinations adjacent said first matrix border; and
    a second linear array of red/blue light combinations adjacent said second matrix border, said arrays being substantially parallel to said axis.

5. In an aircraft runway approach lighting system wherein said runway has a longitudinal centerline and said system includes a sequenced flasher light matrix straddling an axis projected from said centerline, said matrix having rows of lights that are transverse to said axis, the improvement comprising:
    a two-color light combination stationed at each end of each row comprising at least one red light and at least one blue light, all of the lights within each combination being oriented in a straight line coincident with its particular matrix row.

6. In an aircraft runway lighting system wherein said runway has a threshold and a longitudinal centerline and said system includes a plurality of white touchdown zone lights, a first matrix of sequenced flasher lights straddling an axis projected from said centerline, and a second matrix of lights straddling said axis and positioned between said threshold and said first matrix, the improvement comprising:
    a row of blue lights flanking each side of said runway at the threshold end of said runway;
    rows of blue lights interspersed among said touchdown zone lights;
    linear arrays of red/blue light combinations bordering opposite sides of said first matrix; and
    linear arrays of red/blue light combinations bordering opposite sides of said second matrix.

7. In an aircraft runway lighting system wherein said runway has a threshold and a longitudinal centerline and said system includes a plurality of white touchdown zone lights, a first matrix of sequenced flasher lights straddling an axis projected from said centerline, and a second matrix of lights straddling said axis and positioned between said threshold and said first matrix, each matrix having a plurality of rows of lights perpendicular to said axis, the improvement comprising:
    a row of blue lights flanking each side of said runway at the threshold end of said runway;
    rows of blue lights interspersed among said touchdown zone lights; and
    a two-color light combination stationed at each end of each row of each matrix, each combination comprising at least one red light and at least one blue light; all of the lights within each combination being oriented in a straight line coincident with its particular matrix row.

* * * * *